No. 12,248. REISSUED JULY 26, 1904.
G. L. ROLLINS.
MACHINE FOR APPLYING CEMENT TO STOCK.
APPLICATION FILED JUNE 25, 1904.
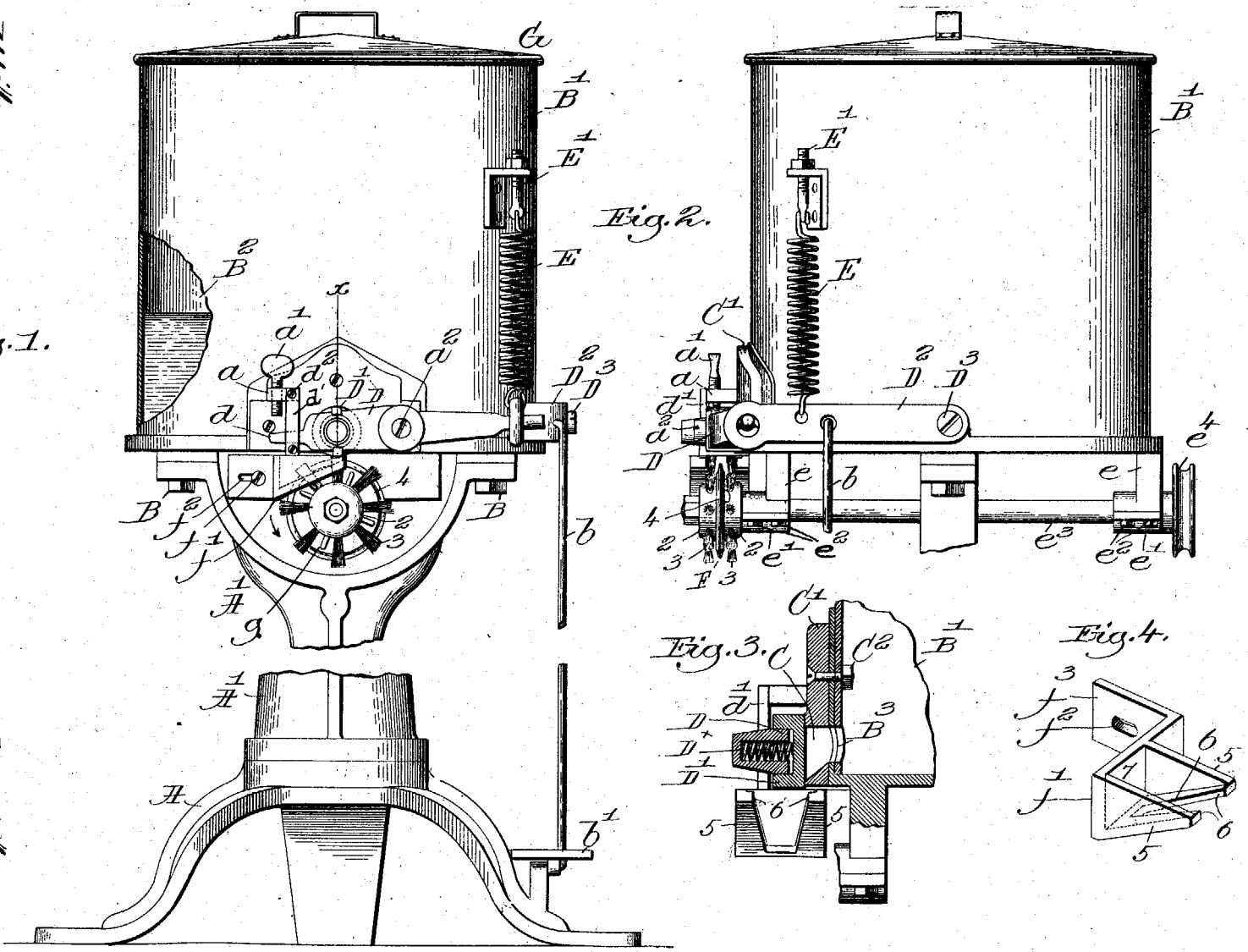
Witnesses:
Fred S. Grunbaf.
S. Wm. Lutton.
Inventor
George L. Rollins,
by Crosby Gregory & Kelly Atys.
THE ECKERT LITHOGRAPHING CO., WASHINGTON, D. C.

UNITED STATES PATENT OFFICE.

GEORGE LORENZO ROLLINS, OF BRIDGEWATER, MASSACHUSETTS.

MACHINE FOR APPLYING CEMENT TO STOCK.

SPECIFICATION forming part of Reissued Letters Patent No. 12,248, dated July 26, 1904.

Original No. 762,254, dated June 7, 1904. Application for reissue filed June 25, 1904. Serial No. 214,198.

*To all whom it may concern:*

Be it known that I, GEORGE LORENZO ROLLINS, a citizen of the United States, residing at Bridgewater, in the county of Plymouth and State of Massachusetts, have invented an Improvement in Machines for Applying Cement to Stock, of which the following description, in connection with the accompanying drawings, is a specification, like characters on the drawings representing like parts.

This invention is an improvement on the apparatus shown in United States Patent No. 743,929, dated November 10, 1903.

The patent shows a revolving brush provided with a projecting guard to enter a channel in an outer sole as a shoe is being fed under the wheel, brushes at opposite sides of the guide applying india-rubber cement to the channel and to the overturned channel-flap.

Herein I have provided novel means for supplying the brush with just the proper quantity of cement, which is expensive, and therefore any means for controlling the quantity of cement used is of great importance.

The cement-outlet in the tank is normally closed by a valve carried by a manually-controlled lever that may be opened when cement is to be let out onto the brush, a strong spring acting instantly to close the outlet when the lever is released by the operator. I have also provided a stripper to remove from the bristles any excess of cement.

Figure 1, in front elevation with the column broken out, shows one of my improved cement-applying machines. Fig. 2 is a side elevation of the tank and brush looking at the right of Fig. 1. Fig. 3 is a partial section in the line *x*, Fig. 1; and Fig. 4 is a perspective view of the stripper detached.

The foot-piece A has a column A′, to which is attached by bolts B a tank B′ for containing the liquid or india-rubber cement, (shown at $B^2$,) said tank having at its lower end (see Fig. 3) a hole $B^3$, that is in communication with an outlet C and a block C′, shown as connected with the tank by a bolt $C^2$. The block has a lug *a*, that receives a stop *a′*, shown as a screw, and a screw or stud $a^2$, that constitutes the fulcrum for a lever D, having a toe *d*, that is guided in a slot behind a plate *d′*, held in place by suitable screws $d^2$. The lever carries a sliding valve-plate D′, that is faced smoothly and is slidable over the faced outer side of the block C. By setting up the screw-stud $a^2$ the closeness of fit of the valve with the block C may be regulated. The valve is shown as applied loosely to the lever, which constitutes a manually-controlled valve-actuator, by prongs of the valve forking over the lever and entering notches in the upper and lower edges thereof. (See Fig. 1.)

The lever D is normally held in such position by a spring E as to close the valve over the outlet and prevent the escape of cement from the tank, and the strength of the spring may be regulated by the adjusting-bolt E′.

The lever D (see Fig. 3) has a socket in which is located a spring $D^{\times}$, that acts constantly to press the valve-plate D′ in close contact with the seat C′.

The stop *a′* by its position determines the extent of opening movement of the lever D, and consequently regulates the quantity of cement, and by adjusting said stop the extent of movement of the valve may be regulated to a nicety and only a predetermined amount of cement be permitted to escape from the tank onto the brush to be described.

The lever D is moved in a direction to uncover the outlet by a lever $D^2$, having its fulcrum at $D^3$, the opposite end of said lever having, as shown, a hole that embraces loosely the outer end of the lever D, the spring E being connected directly with the lever $D^2$.

The lever $D^2$ has attached to it a rod *b*, attached at its lower end to a lever *b′*, pivoted at one end to one of the feet, and when the operator depresses the lever *b′* the valve is moved to uncover the outlet and at the same time the stress of the closing-spring is increased. The mechanism described for controlling the movement of the valve may be moved so quickly and accurately that thinner cement than usual may be used without danger of losing the same. I have ascertained by experiment that with the apparatus herein described it is possible to cement the channel and flaps of a stated number of shoes with about one-half the quantity of cement usually required when the cement is applied to the channel and its flap by means now used.

The bottom of the tank is shown as provided with depending ears $e$, that with straps $e'$, united thereto by bolts $e^2$, form bearings for a brush-shaft $e^3$, that at its front end has secured to it the brush F, which, as shown, consists of two circular blocks 2 of wood and a central piece 4 of metal, the central piece being of larger diameter than the blocks 2, that it may extend beyond the blocks and constitute a guide to enter a channel in a sole, the guide serving to insure the directing of the shoe in the proper path as the latter is moved under the brush by hand, while the bristles 3 of the brush, located at opposite sides of the guide and supplied with cement, apply the latter in the channel at one side of the guide and on the exposed face of the overturned channel-flap, as provided for in the machine shown in said patent.

The arrow, Fig. 1, shows the direction in which the brush is turned by the shaft $e^3$ by, it may be, a driving-belt applied to a pulley $e^4$, secured to said shaft.

A depending portion of the framework has secured thereto by a screw $f$ a wiper $f'$, (shown in Fig. 1 and detached in Fig. 4,) said screw entering a slot $f^2$ in the shank $f^3$ of the wiper. The wiper is arranged on a chord of the circular path of the brush and has two like arms 5, that are tapered at their under sides, as shown, so as to wipe the cement toward the periphery of the brush. These arms near their under edges have inwardly-projecting ribs 6, inclined downwardly and backwardly, as shown by dotted lines, Fig. 1, and by full lines, Fig. 4, said ribs being wider as they approach the upright wall 7 of the wiper, so as to leave a V-shaped space in which the bristles of the brush in the rotation of the latter may travel, the edges 6 of the wiper gradually hugging the bristles more closely and wiping the cement from the hub of the brush toward the ends of the bristles that said cement may be applied to the channel and its flap to properly cement the same that the flap when turned back into the channel to conceal the fastenings therein may securely hold the flap in place.

The application of an excessive quantity of cement to the channel and the flap, or to either, besides being wasteful of expensive cement is also injurious to the shoe. By my machine the best cement in controlled quantity will be used, and the shoes having their channel-flaps cemented by my machine will wear better and longer.

The tank has a cover G, so that the cement therein is not exposed to the atmosphere, and consequently the rapid evaporation of the naphtha in the cement is obviated.

The central part or guiding member of the wheel has a series of projections $g$, (see Fig. 1,) that act against the partially-overturned channel-flap and wipe the same farther back, so that the brushes may act more thoroughly in the channel and on the flap in covering the same with cement.

Having described my invention, what I claim, and desire to secure by Letters Patent, is—

1. In a machine for applying cement to stock, a rotatable brush, a tank having a valve, means to open the valve to discharge cement on the brush, and a wiper arranged between the valve and the axis of rotation of the brush on a chord of the circular path of the brush and slotted that the bristles at the upper edge of the brush may travel therethrough, the wiper wiping from the bristles excess of cement toward the periphery of the brush, substantially as described.

2. In a machine for applying cement to stock, a rotatable brush, means to discharge cement thereon in regulated quantities, and a wiper having inturned lips to act on the bristles of the brush from near the center of rotation thereof toward the edges of the brush as the brush travels through the wiper to carry cement toward the periphery of the brush.

3. In a machine for applying cement to stock, a rotatable brush, means to discharge cement thereon in regulated quantities, a box-like wiper arranged on a chord of the circular path of the brush and having slotted and inturned lips, some of the bristles above the center of rotation of the brush traveling through said box and between its inturned edges, the latter contacting with the outer sides of the bristles and wiping over the same outwardly toward their outer ends.

4. In a machine for applying cement to stock, a rotatable brush, means to provide the same with cement, and a box-like wiper having inturned downwardly-extending lips, said wiper being arranged on the chord of the circular path of the brush to wipe cement toward the periphery of the brush.

5. In a machine for applying cement to stock, a rotatable brush, means to supply it with cement, and a box-like wiper having inturned lips disposed on a chord of the circular path of the brush and presenting a V-shaped opening between the same through which the bristles of the brush above the center of rotation of the brush travel.

6. In a machine for applying cement to stock, a rotatable brush, means to supply cement to the brush, an adjustable box-shaped wiper interposed between the center of rotation of said brush, and the means for supplying cement to the brush, said box having inturned lips to act against the sides of the bristles to wipe the same from near their inner ends outwardly, excess of cement being retained by said lips in said box-shaped wiper.

7. In a machine for applying cement to stock, a rotatable brush, a lever having a loosely-sustained valve, a tank for holding cement, said tank having an outlet with which said valve coacts, means to adjust said lever in a line parallel with said outlet, and a wiper interposed between said valve and the center of rotation of the brush, said wiper having inturned, downwardly-inclined lips presenting a slot between the same in which part of the bristles above the axis of rotation of the brush travel when the brush is applying cement to the stock, said lips removing any excess of cement and retaining the same in said wiper.

In testimony whereof I have signed my name to this specification in the presence of two subscribing witnesses.

GEORGE LORENZO ROLLINS.

Witnesses:

NATHAN HEARD,

MABEL PARTELOW.